United States Patent [19]

Abbondanti

[11] 3,864,620

[45] Feb. 4, 1975

[54] ARRANGEMENT OF PARALLEL STATIC AC POWER SOURCES PROPORTIONS

[75] Inventor: Alberto Abbondanti, Penn Hills, Pa.

[73] Assignee: Westinghouse Electric Corporation, Pittsburgh, Pa.

[22] Filed: Sept. 11, 1973

[21] Appl. No.: 396,161

[52] U.S. Cl. .................. 321/27 R, 307/58, 307/87
[51] Int. Cl. ........................................ H02m 5/00
[58] Field of Search ........ 307/51, 58, 82, 87; 321/5, 321/19, 27 R

[56] References Cited
UNITED STATES PATENTS 3,217,171  11/1965  Corey ................................. 307/87
3,675,037  7/1972  Hamilton ......................... 321/27 R Primary Examiner—R. N. Envall, Jr.
Attorney, Agent, or Firm—J. J. Wood

[57] ABSTRACT

In order to permit static AC power sources connected in parallel to a load to consistently provide a desired porportion of a load current, the amplitude and phase (or frequency) of the voltages produced by the power sources are appropriately controlled. By equating the amplitude and phase controls to current components measured along orthogonal axes, cross currents among the power sources, which produce unbalanced conditions, are eliminated.

8 Claims, 12 Drawing Figures

ARRANGEMENT OF PARALLEL STATIC AC POWER SOURCES PROPORTIONS

BACKGROUND OF THE INVENTION

1. Field of the Invention

This invention relates generally to parallel static AC power sources providing a common load, and more specifically, this invention relates to an arrangement of parallel converters in which each of the converters autonomously assumes a predetermined proportion of the load current.

2. Description of the Prior Art

When several AC generators, such as inverter power supplies, are operated in parallel to feed a common load, it is necessary to include in the system some provision that insures a proper distribution of load current among the parallel units. One approach to controlling load distribution would be to utilize a central supervisory system, to which information regarding the level of the total load current and the level of each individual inverter share of the total load current would be fed. Upon verfication that the share of a given inverter does not conform to the predetermined share of the total load current that it is to provide, the supervisory system would appropriately control the faulty inverter to correct the discrepancy. In addition to the complexity and cost of such a supervisory system, the major drawback is a reduced reliability that such a system imparts to the power supply arrangement as a whole. In many uninterruptible power supply applications, redundant units are paralleled to multiply the reliability and insure the availability of power. Since the arrangement of parallel supplies, when using a central supervisory system, has a reliability not greater than that of the supervisory system, the lack of redundancy by using such a system results in undesirable potential unreliability.

Another approach would be to utilize a master clock generator and a master voltage regulator for the overall arrangement of paralleled inverters, feeding identical frequency and voltage control signals to each inverter. The master controls could be the normal controls of one of the inverters, which would be appointed to the roll of master unit. Through interconnections between the inverters, the other units would be slaved to the master unit by allowing the master control signals to override the normal control functions of the slaved units. Sharing of the load would result as a consequence of the identity of the power circuits. This approach also, however, has an undesirable potential unreliability for some applications, since no redundance is provided in the vital master control functions.

SUMMARY OF THE INVENTION

In order to obviate the disadvantages of prior art devices, the present invention relates to an arrangement of paralleled static alternating current (AC) power supplies such as converters (used in the generic sense to refer to either inversion of DC to AC or cycloconversion of Ac to AC), in which each of the converters autonomously assume a predetermined share of the load current. With such an autonomous arrangement, each converter operates alone, without ties to the other converters other than the common load bus, and without subordination of its controls to any supervisory or master system.

In order to achieve the autonomous operation of the converters, the present invention utilizes regulation of the amplitudes and phases of the converter voltages. (It should be noted that a phase error is the integral of a frequency error and therefore synonymous in this context. In the preferred embodiment disclosed herein, it is actually the frequency of the converter voltages that is controlled.) This control is based upon the consideration that if adjacent converters are not providing the desired portions of the load current, the unbalance may be viewed as each converter providing the desired proportion of load current with a cross current between the converters. By appropriate choice of orthogonal axes, the cross current may be broken into two components in quadrature with each other. By associating voltage amplitude control with one component and voltage frequency control with the other component, it is possible to regulate a malfunctioning converter to eliminate the cross current. By controlling both of the adjacent converters the corrective action is compounded and, in practice, the normal approach would be to equip each of the paralleled converters with a control arrangement.

Appropriate control of each converter is dependent upon a determination of the components of the cross current along the selected axes. First and second current detecting systems are utilized to determine the desire components of the output current of a converter along the selected axes. One method of providing a current detecting system is to utilize a current sensing device, such as a current transformer and a phasing circuit. The phasing circuit includes a phasing network that produces first and second phasing signal components in quadrature with each other and at a predetermined angle with respect to the load current phasor for that converter. In addition, the amplitudes of the phasing signal components are proportional to the amplitude of the load current of the associated converter. Each of the phasing signal components is conveyed to a separate phase sensitive demodulator. A reference source provides a reference signal having the same frequency and phase as the voltage of the converter to both of the phase sensitive demodulators. As a result of the action of the phase sensitive demodulators, first and second control signals representative of load current components along selected axes at a predetermined angle with respect to the converter voltage phasor are produced.

A first control circuit is responsive to a first one of the control signals to control the amplitude of the voltage of the converter to produce a reduction in the cross current component to which it corresponds. The first control circuit obtains a voltage reference signal from a voltage reference source and mixes it with the first control signal, such as by means of a summing node, and compares the result with a similarly scalled representation of the actual voltage amplitude of the converter. If a difference in the two signals is detected by an error amplifier, a corresponding modification in the amplitude of the voltage of the converter is made. Similarly, a second control circuit is responsive to the other control signal to control the frequency of the converter voltage. The second control circuit mixes a frequency reference signal obtained from a frequency reference source with the second control signal, such as by means of a summing node. The resultant signal is applied to a voltage controlled oscillator to produce the desired frequency control of the converter output voltage. Additional control signals may be obtained from an external source and applied to the respective summing nodes to achieve desired amplitude and frequency modification in synchronism with the other paralleled converters.

When a switching apparatus or mechanism is closed to connect the converter to the load line, it is desirable that the converter voltage have the proper frequency and phase to prevent undesired circulating currents. Thus, a prephasing circuit is utilized to insure that the converter voltage frequency and phase are maintained in synchronism with the load voltage. This is achieved by means of yet another phase sensitive demodulator that provides a signal to the frequency summing node. In the case of a three phase arrangement, two of the inputs to the phase sensitive demodulator of the prephasing circuit are obtained from the converter side of the switching mechanism, while the other input is obtained from the load side of the switching mechanism.

With this arrangement, the converter will automatically and autonomously vary its output voltage to insure that is is providing its proper proportion of the load current. This is achieved quickly and simply, and no loss of reliability is encountered, as the other units will accurately control the system even in the presence of the failure of one control arrangement. Even with respect to a control arrangement that fails, provision may be made to insure that such a failure does not result in power loss but only loss of the quality of the signal provided.

The foregoing and other objects, advantages and features of this invention will hereinafter appear, and for purposes of illustration, but not of limitation, an exemplary embodiment of the subject invention is shown in the appended drawing.

DETAILED DESCRIPTION OF THE PREFERRED EMBODIMENT

Figure 1:
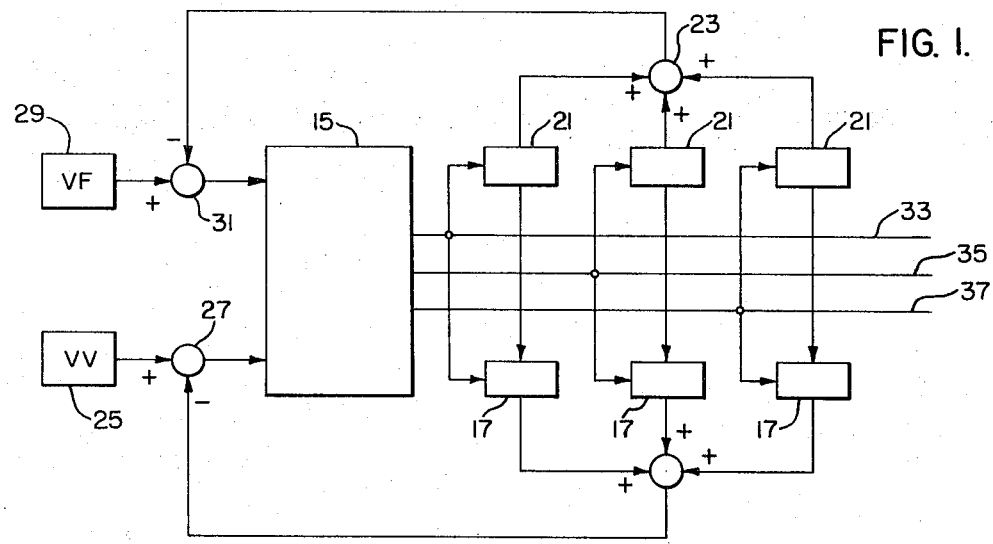
FIG. 1 is a schematic block diagram of a preferred embodiment of one converter feeding a three phase load and constructed in accordance with the present invention.

A preferred embodiment of the present invention is illustrated in functional block diagram form in FIG. 1. A converter (inverter or cycloconverter) 15 is shown arranged for autonomous operation to supply a constant predetermined proportion of a load current when connected in parallel with other similar converters. The particular embodiment disclosed herein is for a three phase arrangement, but it should be recognized that the invention is also applicable a single phase arrangement. A current detecting system 17 is utilized to determine the magnitude of a first component of the output load current of converter 15. In the case of the three phase arrangement illustrated in FIG. 1, a separate current detecting system 17 is utilized for each of the three phases and the outputs thereof are combined in a summing node 19 to produce the voltage $V_v$.

Another set of current detecting systems 21 determine the magnitude of a second component of the output load current of converter 15. As in the case of the current detecting system 17, the outputs of current detecting systems 21 are combined in a summing node 23 to produce a voltage $v_f$.

The components, the magnitude of which is determined by the current detecting systems 17 and 21, are in quadrature with each other. The orthogonal axes along which these components are measured may lie in a wide range of angles with respect to the phasor of the voltage of converter 15. The level of the voltages $v_v$ and $v_f$ are properly scaled at the respective summing nodes to provide the desired effect.

A reference voltage source 25 provides a voltage reference signal VV, which is applied to a summing node 27. A voltage $v_v$ from node 19, which represents the current component associated with the voltage amplitude control, is also applied to the summing node 27. The output of summing node 27 is utilized to control the amplitude of the voltage of converter 15 in accordance with the mix of the reference voltage signal VV and the control signal $v_v$. As a result, the amplitude of the voltage of converter 15 shows a "drooping" characteristic with loading, known as the "voltage droop," which varies with loading of the system as determined by the mix of the reference voltage VV and the control signal $v_v$.

In a similar fashion, a frequency reference signal VF is produced by a frequency reference voltage source 29. Frequency reference signal VF and control signal $v_f$ are applied to a summing node 31, the output of which produces a frequency drooping characteristic with load based upon the difference between the reference voltage VF and the control signal $v_f$.

In some applications the voltage droop is undesirable. To eliminate this voltage droop, it is possible to select the axes along which the current components are measured in such a fashion that the component corresponding to the voltage amplitude control is measured orthogonally to an axis that is angularly spaced from the converter 15 voltage phasor by the power factor angle of the output current of converter 15. Of course, the voltage droop will only be eliminated by this method for a constant load power factor. In practice, the load power factor will normally be changing, so, to optimize elimination of the voltage droop (i.e., improve voltage stability with load variations), one approach is to place this axis along an angle which corresponds to a power factor angle halfway between the maximum and minimum power factor angles. Thus, for example, a common specification for the load power factor is from between 1.0 and 0.8 inductive or lagging. For this specification, the optimum location of the axis corresponding to the voltage amplitude control would be at an angle of $-18.45°$ with respect to the phasor of the voltage of converter 15.

In some applications it may be desirable to eliminate the frequency droop, rather than the voltage droop. In such a case, the desired result may be achieved by measuring the other component of the output load current of converter 15 along the axis identified immediately above. Actually, the current component would be measured in the opposite direction, but the axis would be the same.

Figure 2:
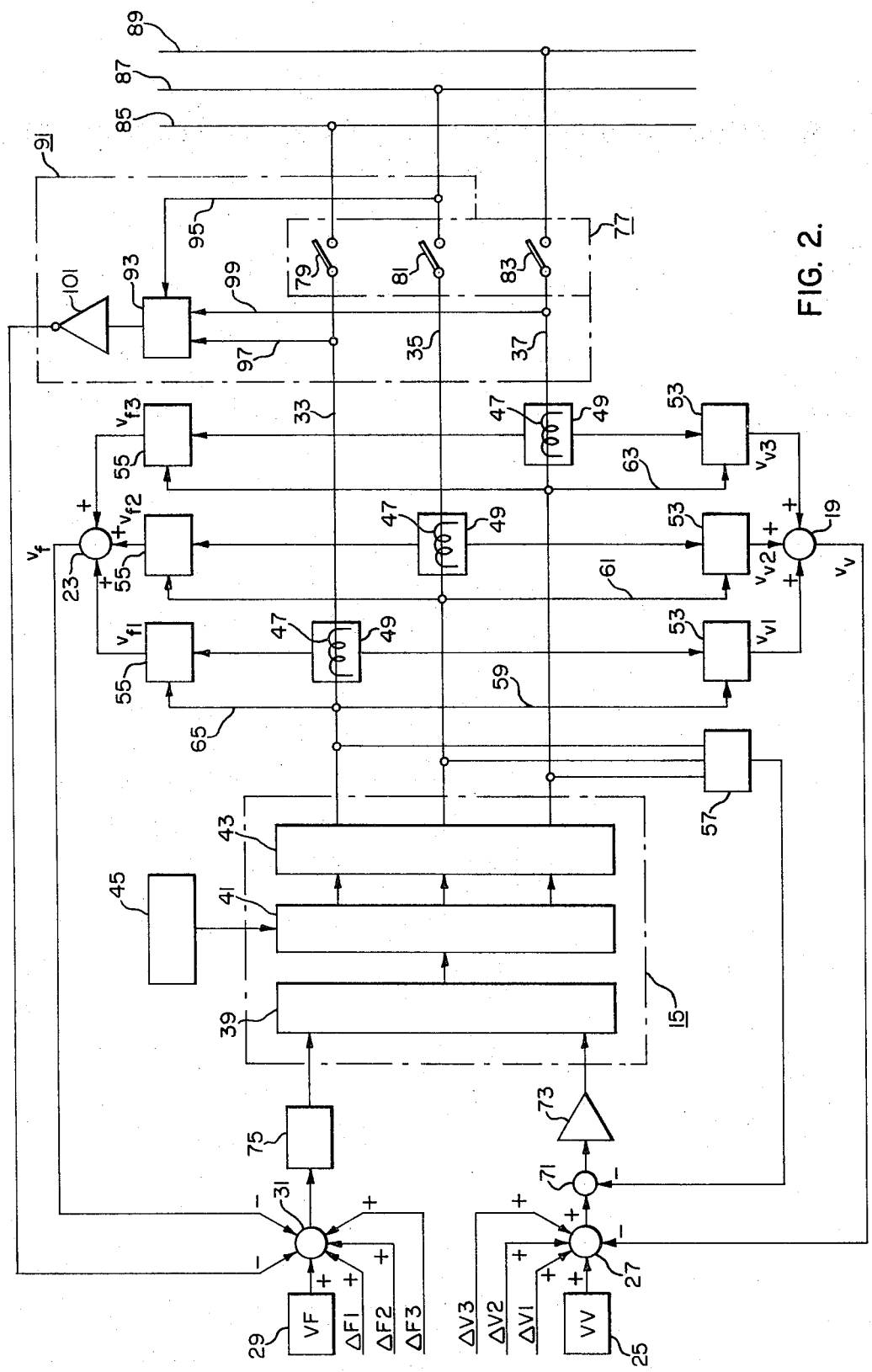
FIG. 2 is a more detailed schematic block diagram of the preferred embodiment of FIG. 1.

The arrangement illustrated in FIG. 1 would be connected to common load lines by the lines 33, 35 and 37. Each of the static power supplies to be connected in parallel with the converter 15 would be arranged as shown and connected to the common load lines. The division of the total load current between the parallel converters could be made in any desired fashion. A common approach would be, of course to determine that the load be divided in proportion to the ratings of the converters utilized. To achieve such a division of the load based on ratings, it is only necessary to establish that the droop gain from characteristics for each of the converters is such as to provide the same maximum voltage droops and the same maximum frequency droops at nominal output current. With reference now to FIG. 2, a more detailed block diagram of the embodiment of FIG. 1 is disclosed. It may be noted that in this FIGURE converter 15 is a identified by three functional blocks, namely: a converter control logic 39; the converter power stages and output transformers, if any 41; and an output filter 43. A DC power supply 45 provides direct current power for the power stages 41, if an inverter is employed. These elements of converter 15 are conventional and may be of the types discussed in the text by B. R. Pelly entitled "THYRISTOR PHASE CONTROLLED-CONVERTER AND CYCLOCONVERTERS," published by Wiley Interscience, Division of John Wiley & Sons, Inc. in 1971.

In the preferred embodiment disclosed herein, the current detecting means 17 and 21 comprise a current sensing device and a phasing current. The current sensing device may be a current sensing transformer 47, as schematically illustrated in FIG. 2. In the case of the three phase arrangement of the preferred embodiment, a current transformer 47 is utilized for each phase. The phasing circuits include a phasing network 51, located in each of the boxes 49 with the current transformers 47, and a pair of phase sensitive demodulators 53 and 55 for each phase of the converter. A phasing network 51 is illustrated in FIG. 3, while a ring demodulator or synchronous rectifier of the type utilized for phase sensitive demodulators 53 and 55, is illustrated in FIG. 4.

Figure 3:
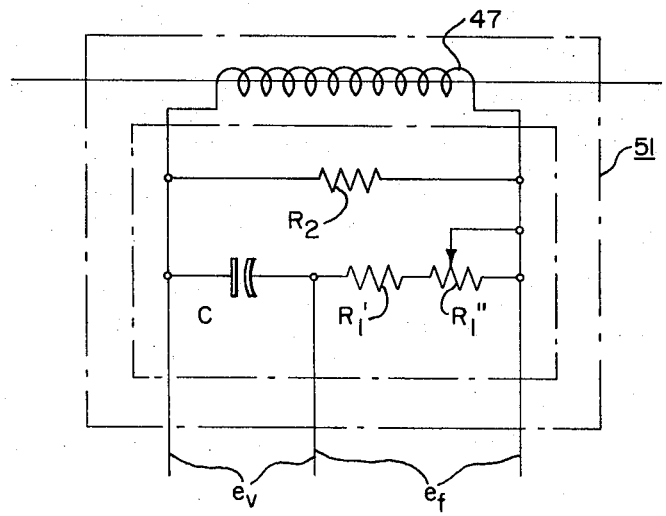
FIG. 3 is a schematic circuit diagram of a phasing network utilized in the preferred embodiment of the present invention.
Figure 4:
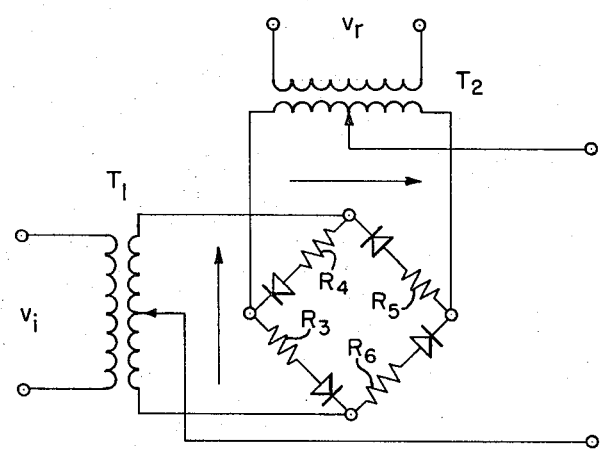
FIG. 4 is a schematic circuit diagram of a phase sensitive demodulator utilized in the preferred embodiment of the present invention.

As may be seen in FIG. 3, the phasing networks 51 have a series combination of a fixed resistor $R_1'$, a variable resistor $R_1''$ and a capacitor C connected in parallel with a resistor $R_2$. As a current $I_n$ from current transformer 47 is conveyed to this network, two voltages $e_v$ and $e_f$, which are in quadrature with each other, may be obtained from across capacitor C and from across the combination of $R_1'$ and $R_1''$, respectively. The voltages $e_v$ and $e_f$ are proportional to the magnitude of the converter load current and have a phase angle with respect to that load current that is determined by the values of the resistors and capacitor. The phasing signal components $e_v$ and $e_f$ are located at a phase angle with respect to the phasor of the converter load current such that when acted upon by the phase sensitive demodulators 53 and 55 control signals will be produced. Each of the control signals represents a component of the output load current taken along one of the orthogonal axes located at a predetermined angle corresponding to the voltage amplitude and frequency controls. The phasing signal components $e_v$ are those that will eventually control the voltage amplitude, while the phasing signal components $e_f$ are those that will eventually control the voltage frequency.

Figure 5:
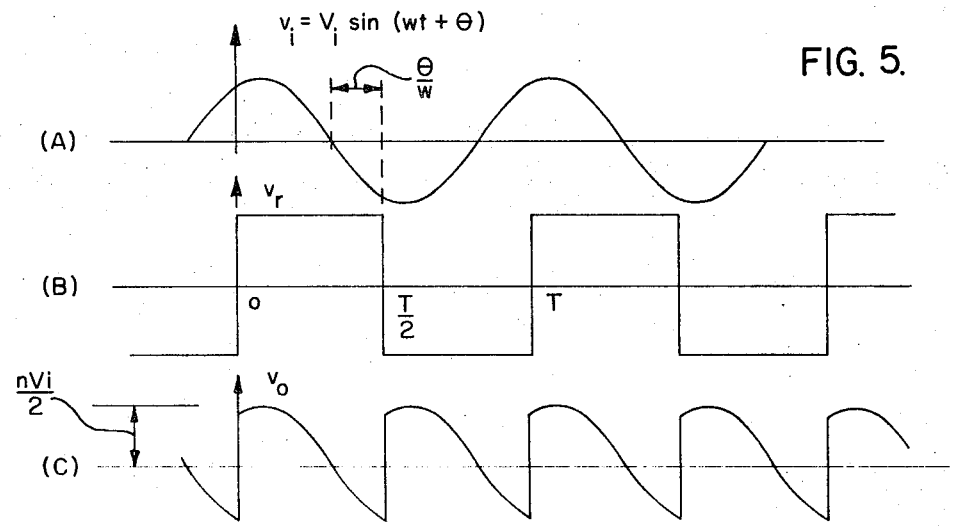
FIG. 5 is a series of waveform diagrams illustrating the operation of the phase sensitive demodulator illustrated in FIG. 4.

Each of the phasing signal components $e_v$ is applied to a corresponding phase sensitive demodulator 53, while the phasing signal components $e_f$ are each applied to a corresponding phase sensitive demodulator 55. The ring demodulator that is utilized for both the phase sensitive demodulator 53 and the phase sensitive demodulators 55 is illustrated in FIG. 4. The generalized input voltage $v_i$ would be one of the phasing signal components $e_v$ or $e_f$ and of the form illustrated in waveform A in FIG. 5. A reference voltage $v_r$ having the frequency and phase of the converter voltage is shown as a square wave in waveform B of FIG. 5. However, a sine wave having an amplitude at least five times greater than the amplitude of $v_i$ could also be used with only a slight inaccuracy. As may be seen from waveforms C of FIG. 5, the phase sensitive demodulator produces an output voltage that is a DC voltage with ripple components superimposed thereon. This DC voltage is defined by the expression:

$V_{DC} = 2/T\ S^{T/2}(nVi/2)\sin(wt+\theta)dt = nVi/\pi \cos\theta$

As $\theta$ is the phase angle between the input voltage $v_i$ and the reference voltage $v_r$, it may be seen that the DC output of the phase sensitive demodulator is dependent upon the phase angle difference between the converter voltage phasor and the phasing signal component $e_v$ or $e_f$. Therefore, by appropriate choice of the phase angle of the phasing signal components, the DC outputs of the phase sensitive demodulators may be made to represent the components of the converter load current along the desired orthogonal axes, as discussed in connection with FIG. 1.

As seen in FIG. 23, the outputs of the phase sensitive demodulators 53 have been identified as $v_v^1$, $v_{v2}$, and $v_{v3}$ for each of the converter phases. These phase sensitive demodulator outputs are conveyed to the summing node 19, where they are combined to produce the voltage amplitude control signal $v_v$. Similarly, the output of phase sensitive demodulators 55 have been identified as $v_{f1}$, $v_{f2}$ and $v_{f3}$, which are combined in summing nodes 23 to form the frequency control signal $v_f$.

The reference voltage $v_r$ is obtained from a transformer and rectifying network 57. The reference voltages for the phase sensitive demodulators 53 are schematically shown as being applied through lines 59, 61 and 63, for purposes of showing the phase being analyzed. Transformer and rectifying network 57 also produces a DC signal representative of the converter voltage which is applied to a summing node 71, together with the output of summing node 27. The result of these signals is applied to an error amplifier 73. If the output of summing node 27, indicative of the desired voltage amplitude, differs from the actual converter voltage amplitude, as indicated by the similarly scaled signal from the transformer and rectifying network 57, the error amplifier 73 produces an appropriate change in the voltage amplitude of converter 15. It should be noted that the voltage reference source 25, summing node 71 and error amplifier 73 would normally appear in a conventional converter in order to obtain the desired output voltage amplitude. However, they are shown as a portion of the control arrangement, in view of the additional function that they must perform in response to the voltage control signal $v_r$ in order to achieve the desired paralleling arrangement.

As indicated above, additional inputs may be utilized to obtain system voltage regulation. These inputs have been designated as $\Delta V1$, $\Delta V2$, $\Delta V3$, which would be utilized for functions such as vernier control, regulation and converse regulation. These inputs would be applied to the summing nodes 27 of all the converters simultaneously in order to obtain the desired voltage regulation.

In the case of the frequency control, the output of summing node 31 is applied to a variable frequency oscillator, such as a voltage controlled oscillator 75. The mixture of the frequency reference signal VF and the frequency control signal $v_c$ causes the voltage controlled oscillator 75 to adjust the frequency of converter 15, if there is an imbalance in the system that causes a cross current having a component along the axis corresponding to the frequency control. As in the case of system voltage regulation, system frequency regulation may be obtained by the introduction of signals $\Delta F1$, $\Delta F2$ and $\Delta F3$ to summing node 31. The signals will simultaneously be applied to the summing nodes 31 of all the converters in the parallel arrangement.

A switching mechanism 77 having ganged switches 79, 81 and 83 is employed to connect and disconnect converter 15 from the common load lines 85, 87 and 89. When it is desired to actuate the switching arrangement 77 to connect a converter, such as converter 15, to the common load lines 85, 87 and 89, the voltage of that converter may be different in amplitude, frequency and phase from the load voltage. In such a case undesired circulating currents may be produced. As a practical matter, the circulating currents resulting from amplitude differences are quite small and can normally be ignored. However, the phase differences may produce intolerable circulating currents. Thus, a prephasing network 91 is utilized to determine that the output voltage of the converter 15 is always in phase with the load voltage. This is achieved by utilizing a phase sensitive demodulator 93, of the type shown and described in connection with FIG. 4. The input signal for demodulator 93 is obtained from the load side of one of the switches 79, 81 or 83, shown in this example as being obtained from the load side of switch 81 on line 95. The reference voltage for demodulator 93 is obtained by combining the voltages on the converter side of the other two switches, shown as on lines 97 and 99 in this example. The prephasing control signal obtained from demodulator 93 is then passed through an amplifier 101 and conveyed to summing node 31, along with the frequency reference voltage VF and the frequency control signal $v_f$. In this way, the frequency of converter 15 is always maintained so that there is no phase differential between the voltage converter 15 and the load voltage, so that upon actuation of the switching mechanism 77 there are no undesired circulating currents.

In order to further illustrate the details of the present invention, a specific example of the preferred embodiment discussed above is shown and described in connection with FIGS. 6–12. This specific example relates to a system of two inverters of equal ratings having the following characteristics: a nominal output power of 36.5 kav; a nominal output voltage of 220 volts, three phase (line to line); a nominal output current of 96 amps; a nominal output frequency of 60 Hz; and a load power factor range of from 1.0 to 0.8 lagging.

For the current transformers 47, specially wound conventional current transformers are used, having the following characteristics:

```
Core         Arnold     4178-S-2
Wire         No. 30
Ratio        2000:1
Secondary inductance (at 60 Hz) 400 Henry
Secondary DC resistance 40 ohms
Secondary voltage at which saturation
    effects appear 20 volts ms
```

In order to obtain a feedback signal without the use of amplifying devices, and thus increase reliability, the current transformers are required to produce a secondary voltage of at least 4 volts ms in to a load impedance in the range of 100 ohms.

Figure 6:
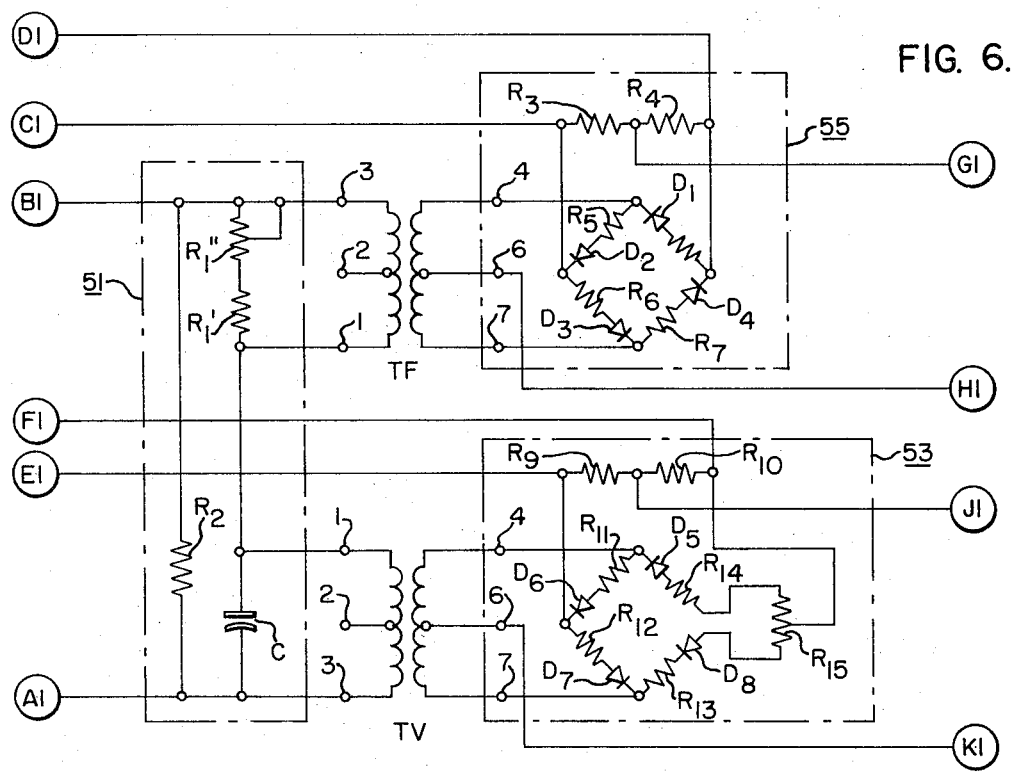
FIG. 6 is a schematic circuit diagram illustrating the actual connection of the circuits illustrated in FIGS. 3 and 4.

In FIG. 6, the phasing network 51 and the phase sensitive demodulators 53 and 55 for a single phase of this specific example are illustrated. It should be noted that a circuit of the type illustrated in FIG. 6 will be used for each of the three phases in the specific example and that the second and third phases would have identical terminals with the numerals 2 and 3, respectively, rather than the numeral 1 to designate the appropriate phase. The values for the circuit elements illustrated in FIG. 6 are as follows:

```
R_1'                     68 ohms, 1%, ¼ watt
R_1''                    Trimpot, 15 turns, 100 ohms
R_2                      120 ohms, 1%, ¼ watt
R_3,R_4,R_3,R_16         1.2 Kohms, 1%, 1 watt
R_5 thru R_8,R_11,R_12   5.1 Kohms, 1%, ¼ watt
R_13,R_14                4.6 Kohms, 1%, ¼ watt
R_15                     Trimpot, 15 turns, 1000
C                        10 microfarad, 5%
TF, TV                   UTC0-26
D thru D_8               1N4148
```

Figure 7:
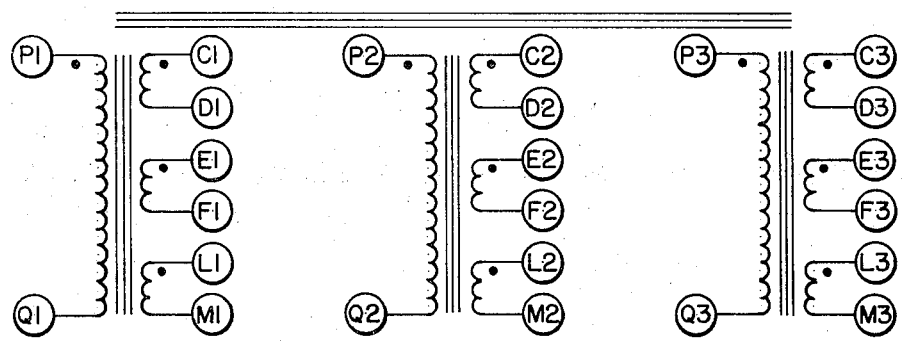
FIG. 7 is a schematic circuit diagram of a reference signal transformer utilized in the preferred embodiment of the present invention.
Figure 8:
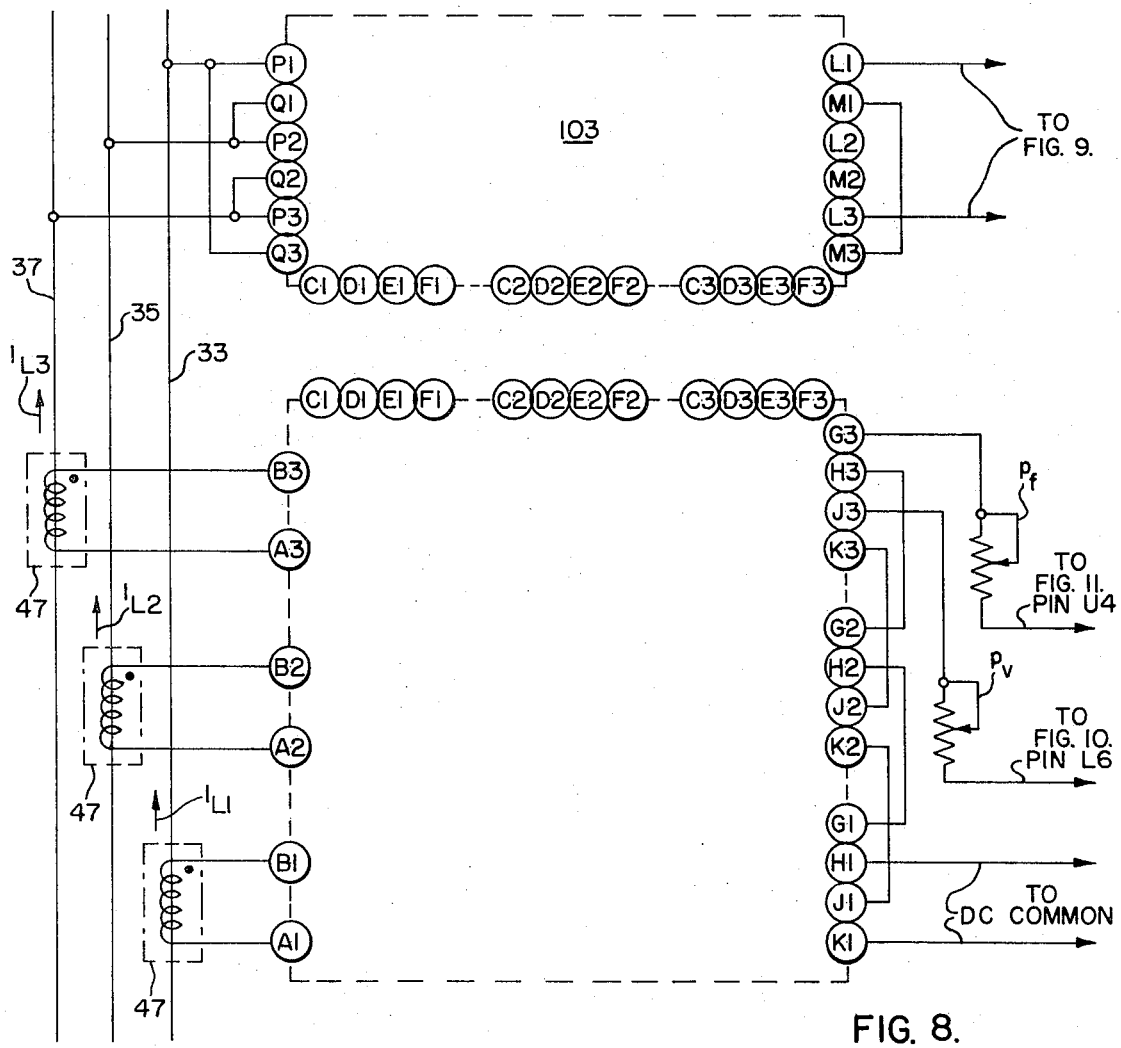
FIG. 8 is a schematic diagram illustrating the interconnections of the circuitry of FIGS. 6 and 7.

A reference signal transformer 103, which is a portion of the transformer and rectifying network 57, is illustrated in FIG. 7. This transformer provides various reference signals utilized in the specific example of the present invention. As may be seen in FIG. 8, the primary sides of the transformer segments for each phase, designated by the Letters P and Q, are connected to line voltages $V_{L1}$, $V_{L2}$ and $V_{L3}$ at the output of converter 15. The secondary connections for the reference signal transformer 103 are as illustrated in FIGS. 8–11. In FIG. 8 the pins and connections of reference signal transformer 102 to the FIG. 6 circuitry (expanded to include all three phases), is shown, as well as certain connections to other circuits illustrated in detail in other figures. Thus, it may be seen that the terminals L and M of reference transformer 103 are connected to the prephasing circuit of FIG. 9. In addition, terminals or pins G3 and J3 are connected to the voltage controlled oscillator of FIG. 11 and the error amplifier of FIG. 10, respectively. These connections convey the frequency and voltage control signals $v_f$ and $v_r$, which control the frequency and voltage amplitude drooping characteristics of the converter 15 voltage. Final adjustment of the drooping factor control signals is achieved by 20,000 ohm trimming potentiometers $P_f$ and $P_r$. Pins H1 and K1 are connected to the DC common for the control signals $v_f$ and $v_r$, respectively.

The reference signal transformer 103 has the following characteristic data:
  Core — Westinghouse — TH–58
  Number of turns — primaries 1500, secondaries 300
  Wire size No. 31

Figure 9:
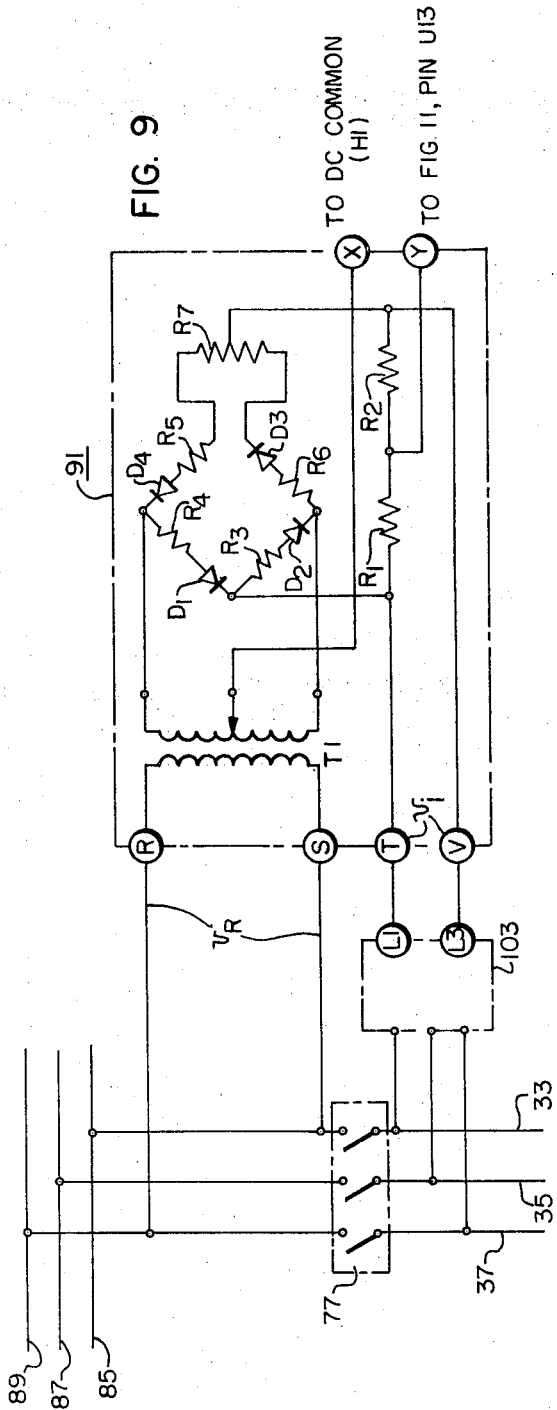
FIG. 9 is a schematic circuit diagram of a prephasing circuit utilized in the preferred embodiment of the present invention.

Phase sensitive demodulator 93 and the connections for the prephasing network 91 of this specific example are illustrated in FIG. 9. From this diagram it may be seen that the input signal for phase sensitive demodulator 93 is obtained from terminals L1 and L3 of the reference transformer 103, while the reference signal is obtained from across lines 35 and 37 at the load side of switching mechanism 77. The prephasing control signal on terminal y is conveyed to the voltage controlled oscillator of FIG. 11, while the terminal X is connected to the DC common side of the frequency control signal $v_f$, which corresponds to pin H1 in FIG. 8. The values of the various elements of the prephasing network 91 are as follows:

| | |
|---|---|
| $R_1, R_2$ | 1.2 Kohms, 1%, 1 watt |
| $R_3, R_4$ | 20 Kohms, 1%, ¼ watt |
| $R_5, R_6$ | 17.5 Kohms, 1%, ¼ watt |
| $R_7$ | Trimpot, 15 turns, 5000 ohms |
| $D_1, D_2, D_3, D_4$ | 1N4148 |
| T1 W ANL6 6238083H04 220v/30VCT | |

Figure 10:
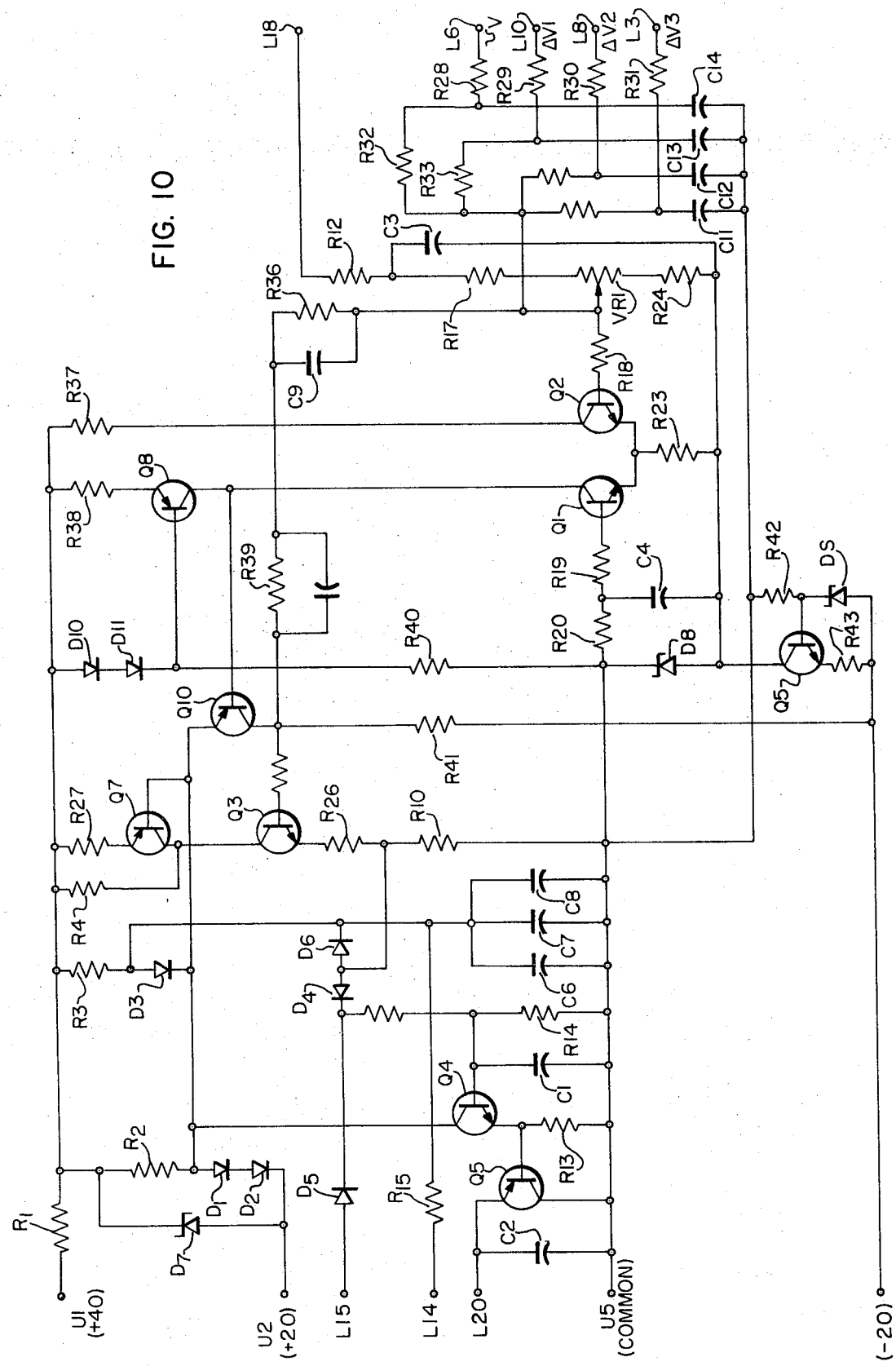
FIG. 10 is a schematic circuit diagram of an error amplifier utilized in the preferred embodiment of the present invention.

The functions of the voltage amplitude reference source 25, summing nodes 27 and 71, and error amplifier 73 are performed by the circuit illustrated in FIG. 10. Terminals U1, U2 and U3 have DC supply voltages of the magnitude indicated applied there to, while U5 is a common line. Terminals L14 and L15 are utilized to provide converter auxiliary functions, such as soft start and manual pulsewidth control, respectively. The output control signal for converter 15 is obtained from terminal L20. The sending signal from transforming and rectifying circuit 57, indicative of the actual amplitude of the voltage of converter 15, is applied to terminal L18. The voltage amplitude control signal $v_v$ as applied to pin or terminal L6, while the external regulatory signals $\Delta V1$, $\Delta V2$ and $\Delta V3$ are applied to pins L10, L8 and L3, respectively. The values of the various elements of this circuit are as follows:

| | |
|---|---|
| $R_1$ | 100 ohms, 5 watts, 5% |
| $R_2, R_8, R_9, R_{18}, R_{19}$ | 330 ohms, ½ watt, 5% |
| $R_3, R_{10}, R_{14}$ | 22 kohms, ½ watt, 5% |
| $R_4, R_{13}, R_{20}$ | 1 Kohm, ½ watt, 5% |
| $R_{12}, R_{17}$ | 7.5 kohms, 1 watt, 1% |
| $R_{15}$ | 39 ohms, ½ watt, 5% |
| $R_{23}$ | 6.8 kohms, ½ watt, 5% |
| $R_{24}$ | 560 ohms, ½ watt, 1% |
| $R_{26}$ | 22 ohms, ½ watt, 5% |
| $R_{27}$ | 1.5 kohm, ½ watt, 5% |
| $R_{28}$ | 100 ohm, ½ watt, 5% |
| $R_{29}, R_{30}, R_{33}, R_{34}$ | 50 kohm, ½ watt, 1% |
| $R_{31}, R_{35}$ | 3.5 kohm, ½ watt, 1% |
| $R_{32}$ | 2 kohm, ½ watt, 1% |
| $R_{36}$ | 6.2 kohm, ½ watt, 5% |
| $R_{37}$ | 5.6 kohm, ½ watt, 5% |
| $R_{38}, R_{42}$ | 1 kohm, ½ watt, 5% |
| $R_{39}$ | 680 kohm, ½ watt, 5% |
| $R_{40}$ | 22 kohm, ½ watt, 5% |
| $R_{41}$ | 10 kohm, ½ watt, 5% |
| $R_{43}$ | 270 ohm, ½ watt, 5% |
| $C_1$ | 0.1 microfarad |
| $C_2$ | 1 microfarad |
| $C_3$ | 12 microfarads, 150V, Tantalum |
| $C_4, C_6, C_7, C_8$ | 500 microfarads, 25V |
| $C_9$ | 0.47 microfarad |
| $C_{10}, C_{11}, C_{14}$ | 5 microfarads |
| $C_{12}, C_{13}$ | 0.33 microfarad |
| $D_1, D_2, D_3, D_4, D_5, D_6$ | 1N4148 |
| $D_7$ | 1N3995 |
| $D_8$ | 1N937 |
| $D_9$ | 1N960 |
| $D_{10}, D_{11}$ | 1N4148 |
| $Q_1, Q_2, Q_3, Q_4$ | 2N1711 |
| $Q_5$ | 2N1131 |
| $Q_7$ | 2N3638A |
| $Q_8, Q_{10}$ | 2N2905A |
| $Q_9$ | 2N2219 |
| $VR_1$ | 500 ohm |

Figure 11:
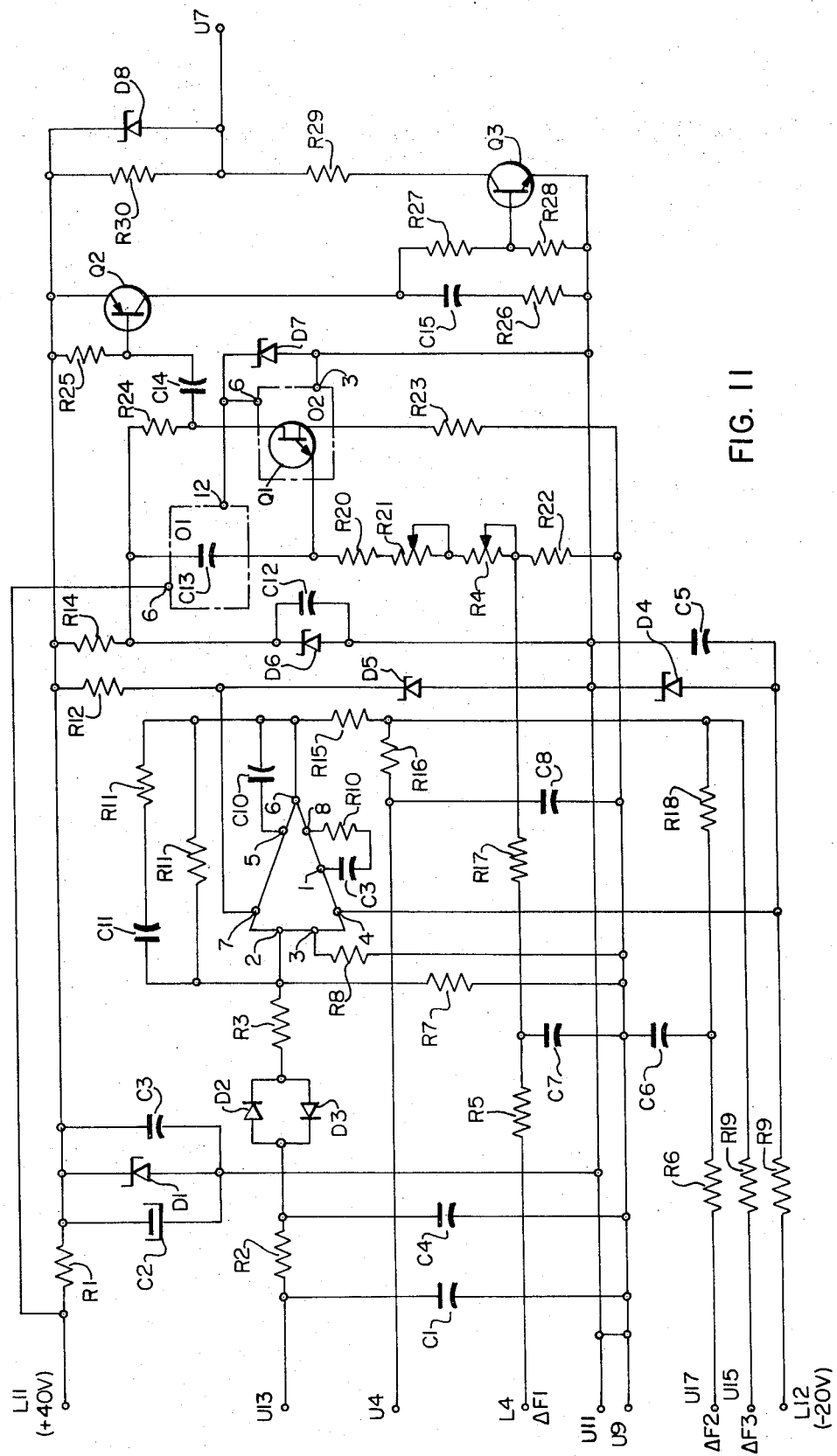
FIG. 11 is a schematic circuit diagram illustrating a voltage controlled oscillator utilized in the preferred embodiment of the present invention.

To perform the functions of the frequency reference signal source 29, summing node 31 and the variable frequency voltage controlled oscillator 75 in the specific example employing the present invention, the circuitry of FIG. 11 is utilized. Voltage controlled oscillator 75 is essentially a very stable unijunction relaxation oscillator Q1, which is actually an integrated circuit having the characteristics of a standard unijunction transistor of the complementary type. An integrating capacitor C13 governs the period of oscillation and is of a ceramic temperature compensated type. The charging resistance network for C13 comprises a resistor R20, trimpot R21 and a small resistor R22. Since resistor R20 directly influences the frequency of oscillation of Q1, a precision wire wound type of resistor is utilized. Trimpot R21 allows calibration of the nominal output frequency to account for tolerances on the value of C13 and on the intrinsic standoff ratio of Q1. The small resistor R22 is utilized to allow mixing of the external signals. These input signals are the frequency control signal $v_f$, applied to terminal U4 and injected through resistor R16, the external regulatory signals $\Delta F1$, $\Delta F2$ and $\Delta F3$, connected to terminals L4, U17 and U15 and injected through resistors R17, R18 and R19, respectively, and the prephasing signal applied to terminal U13 and injected through resistor R15. As for the other terminals, L11 and L12 have DC voltages of the indicated magnitude thereto, while terminals U9 and U11 are connected to DC common lines. Output pulses of the desired frequency are obtained from pin U7. The values of the various components of the circuit are as follows:

| | |
|---|---|
| $R_1$ | 390 ohms, 2 watt, 5% |
| $R_2, R_3, R_{11}, R_{21}$ | 10 kohms, ½ watt, 5% |
| $R_5, R_6, R_{17}, R_{18}$ | 43 kohms, ½ watt, 1% |
| $R_7, R_8$ | 5.1 kohms, ½ watt, 5% |
| $R_9, R_{12}$ | 820 ohms, ½ watt, 5% |
| $R_{10}$ | 1.5 kohms, ½ watt, 5% |
| $R_{13}$ | 75 kohms, ½ watt, 5% |
| $R_{14}$ | 620 ohms, ½ watt, 1% |
| $R_{15}, R_{19}$ | 62 kohms, ½ watt, 5% |
| $R_{16}, R_{22}$ | 1 kohm, ½ watt, 1% |
| $R_{20}$ | 220 ohms, ½ watt, 1% TC = ± ppm/°C |
| $R_{23}$ | 150 ohms, ½ watt, 1% |
| $R_{24}$ | 50 ohms, ½ watt, 1% |
| $R_{25}, R_{27}, R_{30}$ | 1 kohm, ½ watt, 5% |
| $R_{26}$ | 39 ohms, ½ watt, 5% |

| | -Continued |
|---|---|
| $R_{20}$ | 100 ohms, ½ watt, 5% |
| $C_1, C_4$ | 2 microfarad |
| $C_2$ | 100 microfarads, 30V |
| $C_3, C_5, C_{12}$ | 0.1 microfarad |
| $C_6, C_7$ | 0.33 microfarad |
| $C_8$ | 5 microfarads, film |
| $C_9$ | 500 picofarads |
| $C_{10}$ | 20 picofarads |
| $C_{11}$ | 1 microfarad |
| $C_{13}$ | 6,200 picofarads, TC = 30 ppm/°C (EMC E0200AT622) |
| $C_{14}$ | 1000 picofarads |
| $C_{15}$ | .015 microfarad |
| $D_1$ | 1N3029B (24V, 1 watt) |
| $D_2, D_3$ | 1N4148 |
| $D_4, D_5$ | 1N9638B (12V) |
| $D_6$ | 1N942 (11.7V, TC = .005%/°C) |
| $D_7$ | 1N2984B |
| $D_8$ | 1N964B (13V) |
| $Q_1$ | D5k1 (G.E.) |
| $Q_2$ | 2N2905 |
| $Q_3$ | 2N2219 |
| $M_1$ | MC1709CG |
| $R_4$ | Trimpot, Cermet, 10 kohms, TC = ±250 ppm |
| $R_{21}$ | Trimpot, wirewound, 50 kohms, TC = ±50 ppm (Amphenol Mod. 992) |
| 01 | Component Oven, Klixon (T.I.) Mod. 4ST1-2 |
| 02 | Component Oven, Mod. 5ST1-2 |

Figure 12:
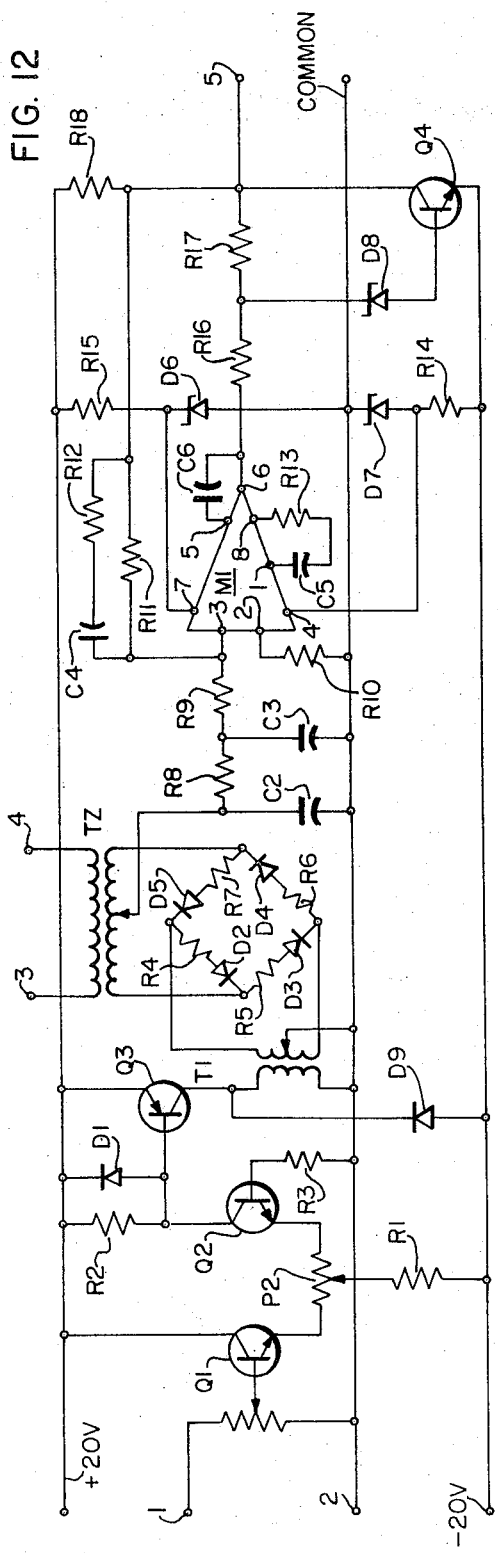
FIG. 12 is a schematic circuit diagram of a frequency regulating circuit that may be utilized in connection with the preferred embodiment of the present invention.

In order to illustrate the type of common external control that may be utilized at the ΔF and ΔV inputs, a frequency regulator circuit is shown in FIG. 12. A fixed frequency input signal is applied to terminals 1 and 2 to provide a reference signal for a ring demodulator. An input signal for the ring demodulator is applied to terminals 3 and 4, such as by connecting these terminals to two of the three load lines. The ouput control signal on terminal 5 is applied to an appropriate ΔF input in FIG. 11 (such as U17 in this particular example). A squaring circuit comprising transistors Q1 and Q2 drives the transistor Q3 to provide the reference signal for the ring demodulator. The demodulated output voltage of the demodulator is filtered and amplified by the wide dyanmic range amplifier consisting of integrated circuit M1 and transistor Q4. Potentiometer P1 permits the use of a variety of output levels from the fixed frequency oscillator, while potentiometer P2 permits to accommodate of a slight amount of DC from the fixed frequency oscillator. The values of the circuit components for the frequency regulator circuit are as follows:

| | |
|---|---|
| $R_1$ | 2 kohms, ½ watt, 5% |
| $R_2$ | 1 kohm, ½ watt, 5% |
| $R_3$ | 2.4 Kohms, ½ watt, 5% |
| $R_4, R_5, R_6, R_7$ | 20 kohms, ½ watt, 1% |
| $R_8, R_9, R_{12}$ | 10 kohms, ½ watt, 5% |
| $R_{10}$ | 22 kohms ½ watt, 5% |
| $R_{11}$ | 110 kohms, ½ watt, 5% |
| $R_{13}$ | 1.5 kohms, ½ watt, 5% |
| $R_{14}, R_{15}$ | 820 kohms, ½ watt, 5% |
| $R_{16}$ | 5.1 kohms, ½ watt, 5% |
| $R_{17}$ | 15 kohms, ½ watt, 5% |
| $R_{18}$ | 2.2 kohms, ½ watt, 5% |
| $P_1$ | 10 kohms |
| $P_2$ | 100 ohms |
| $C_1$ | 10 microfarads, film |
| $C_2, C_3$ | 2 microfarads |
| $C_4$ | 1 microfarad |
| $C_5$ | .005 microfarad |
| $C_6$ | 200 picofarad |
| $Q_1, Q_2, Q_4$ | 2N2219 |
| $Q_3$ | 2N2905 |
| $D_1, D_2, D_3, D_4, D_5, D_6$ | 1N965 (15V) |
| $D_8$ | 1N968B (20V) |
| $T_1$ | THORD. 20A16 |
| $T_2$ | W 623B089H04 |
| $M_1$ | MC1709CG |

With the arrangement of parallel load converters described herein, voltage and frequency stability equal to those available, from forced sharing paralleling methods can be achieved. Yet, no supervisory system is used, thus eliminating a major cause of system failure. In case of failure in the regulation loops or in the master reference sources, proper design of these elements can limit the damage to an impairment of the system characteristics (loss of regulation) without loss of power, thus safeguarding the power availability.

It should be understood that various modifications changes and variations may be made in the arrangements, operations and details of construction of the elements disclosed herein without departing from the spirit and scope of the present invention.

I claim:

1. An arrangement of parallel static AC power sources autonomously assuming the proper proportions of load current comprising:

first and second converter circuits connected in parallel;

first current sensing means to produce a signal representative of the output load current of said first converter;

first phasing means responsive to the signal from said first current sensing means to produce a first control signal representative of a first component of the load current of said first converter and a second control signal representative of a second component of the load current of said first converter, said second signal component being in quadrature with said first component;

first control means comprising a voltage reference source, a voltage summing node and an error amplifier, said voltage reference source providing a voltage reference signal, said voltage reference signal and said first control signal being applied to said voltage summing node, said error amplifier controlling the voltage amplitude of said first converter in response to the difference between the output of said voltage summing node and a similarly scaled representation of the amplitude of the output voltage of said first converter, said first control means being responsive to said first control signal produced by said first phasing means to control the amplitude of the voltage of said first converter in such a fashion as to cause said first proportion converter to tend to supply a constant predetermined proportion of the total load current;

second control means responsive to said second control signal produced by said first phasing means to control the frequency of the voltage of said first converter in such a fashion as to cause said first converter to tend to supply a constant predetermined proportion of the total load current; and an external input to said voltage summing node to adjust the amplitude of the voltage of said first converter in proportion to a similar adjustment in the amplitude of the voltage of said second converter, 2. An arrangement of parallel static AC power sources autonomously assuming the proper proportions of load current comprising:

first and second converter circuits connected in parallel;

first current sensing means to produce a signal representative of the output load current of said first converter;

first phasing means responsive to the signal from said first current sensing means to produce a first control signal representative of a first component of the load current of said first converter and a second control signal representative of a second component of the load current of said first converter, said second signal component being in quadrature with said first component; first control means responsive to said first control signal produced by said first phasing means to control the amplitude of the voltage of said first converter in such a fashion as to cause said first proportion converter to tend to supply a constant predetermined proportion of the total load current;

second control means comprising a frequency reference source, a frequency summing node and a voltage controlled oscillator, said frequency reference source providing a frequency reference signal, said frequency reference signal and said second control signal being applied to said frequency summing node, said voltage controlled oscillator being responsive to the output of said frequency summing node to control the frequency of the voltage of said first converter, said second control means being responsive to said second control signal produced by said first phasing means to control the frequency of the voltage of said first converter in such a fashion as to cause said first converter to tend to supply a constant predetermined proportion of the total load current; and an external input to said frequency summing node to adjust the frequency of the voltage of said first converter in proportion to a similar adjustment in the frequency of said second converter.

3. An arrangement of parallel static AC power sources autonomously assuming the proper proportions of load current comprising:

first and second converter circuits connected in parallel;

first current sensing means to produce a signal representative of the output load current of said first converter;

first phasing means responsive to the signal from said first current sensing means to produce a first control signal representative of a first component of the load current of said first converter and a second control signal representative of a second component of the load current of said first converter, said second signal component being in quadrature with said first component;

first control means responsive to said first control signal produced by said first phasing means to control the amplitude of the voltage of said first converter in such a fashion as to cause said first proportion converter to tend to supply a constant predetermined proportion of the total load current;

second control means responsive to said second control signal produced by said first phasing means to control the frequency of the voltage of said first converter in such a fashion as to cause said first converter to tend to supply a constant predetermined proportion of the total load current;

switching means to selectively connect said first converter to the load; and prephasing means to assure that the voltage of said first converter is in phase with the load voltage when said switching means disconnect said first converter from the load, in order that upon actuating of said switching means to connect said first converter to the load no circulating currents are produced as a result of phase differences between the load voltage and the voltage of said first converter.

4. An arrangement of parallel sources of AC power autonomously assuming the proper proportions of load current comprising:

a plurality of three phase converters adapted to be connected in parallel to a common load;

a current transformer for each phase of a first one of said converters, each of said current transformers producing a signal representative of the output load current of the corresponding phase of said first converter;

a phasing network for each phase of said first converter, each of said phasing networks responsive to a related one of said current transformers to produce a first phasing signal component along an axis at a predetermined angle with respect to the phasor of the output load current of said first converter and a second phasing signal component in quadrature therewith, said first and second signal components having amplitudes proportional to the load current of the corresponding phase of said first converter;

a reference source to provide reference signals, each reference signal having the phase of the load current of a corresponding phase of said first converter;

a first phase sensitive demodulator for each phase of said first converter, each of said first phase sensitive demodulators responsive to said first phasing signal component and said reference signal for the corresponding phase of said first converter to produce a first control signal representative of a first component of the load current for that phase of said first converter;

a second phase sensitive demodulator for each phase of said first converter, each of said second phase sensitive demodulators responsive to said second phasing signal component and said reference signal for the corresponding phase of said first converter to produce a second control signal representative of a second component of the load current for that phase of said first converter;

a first voltage summing node to which the outputs of said first phase sensitive demodulators are applied to produce a composite first control signal;

a voltage reference source to provide a voltage reference signal;

a second voltage summing node to which said composite first control signal and said voltage reference signal are applied;

an error amplifier to control the voltage amplitude of said first converter in response to the difference between the output of said second voltage summing node and a similarly sealed representation of amplitude of the output voltage of said first converter;

a first frequency summing node to which the output of said second phase sensitive demodulators are applied to produce a composite second control signal;

a frequency reference source to provide a frequency reference signal;

a second frequency summing node to which said composite second control signal and said frequency reference signal are applied; and a voltage controlled oscillator responsive to the output of said second frequency summing node to control the frequency of the voltage of said first converter.

5. An arrangement as claimed in claim 4 and further comprising:

switching means to selectively connect said first converter to the load; and prephasing means to assure that the voltage of said first converter is in phase with the load voltage when said switching means disconnect said first converter from the load, in order that upon actuation of said switching means to connect said first converter to the load no circulating currents are produced as a result of phase differences between the load voltage and the voltage of said first converter.

6. An arrangement as claimed in claim 5 wherein said prephasing means comprises a third phase sensitive demodulator responsive to one line-to-line voltage on the load side of said switching means and the other line-to-line voltages taken from the converter side of said switching means, the output of said third phase sensitive demodulator being applied to said second frequency summing node.

7. An arrangement as claimed in claim 6 and further comprising external inputs to said second voltage summing node and said second frequency summing node to adjust the amplitude and frequency, respectively, of said first converter in proportion to similar adjustments in the amplitude and frequency of the voltage of the other converters.

8. An arrangement for causing parallel static AC generators to autonomously assume the proper proportion of a load current comprising:

first current detecting means to determine a magnitude of a first component of the output current of a selected one of the static AC generators and produce a first control signal representative thereof;

second current detecting means to determine the magnitude of a second component of the output current to the selected static AC generator and produce a second control signal representative thereof, said second component being in quadrature with said first component;

first control means responsive to said first control signal produced by said first current detecting means to control the amplitude of the voltage of the selected first static AC generator in such a fashion as to cause the selected static AC generator to tend to supply a constant proportion of the load current;

second control means responsive to said second control signal produced by said second current detecting means to control the frequency of the voltage of the selected static AC generator in such a fashion as to cause the selected static AC generator to tend to supply a constant proportion of the load current;

third current detecting means to determine the magnitude of a first component of the output current of a second one of the static AC generators and produce a signal representative thereof;

fourth current detecting means to determine the magnitude of a second component of the output current of the second static AC generator and produce a signal representative thereof, said second component being in quadrature with said first component;

third control means responsive to the signal produced by said third current detecting means to control the amplitude of the voltage of the second static AC generator in such a fashion as to cause the second static AC generator to supply a constant proportion of the load current;

fourth control means responsive to the signal produced by said fourth current detecting means to control the phase of the voltage of the second static AC generator in such a fashion as to cause the second static AC generator to tend to apply a constant proportion of the load current;

the droop gain characteristics of said first and third control means being established to provide the same maximum voltage droops at nominal output current; and the droop gain characteristics of said second and fourth control means being established to provide the same maximum frequency droop at nominal output current, whereby the two static AC generators divide the load current in proportion to their respective ratings.

* * * * *